United States Patent [19]

Henneberg et al.

[11] Patent Number: 4,575,033
[45] Date of Patent: Mar. 11, 1986

[54] TILT-SWIVEL BASE FOR A CRT DISPLAY TERMINAL

[75] Inventors: Helmut H. Henneberg, Canton; Richard R. Dillon, Wellesley; Domenic R. Romano, Chelmsford, all of Mass.; Roger L. Hall, Nashua, N.H.

[73] Assignee: Honeywell Information Systems Inc., Waltham, Mass.

[21] Appl. No.: 482,115

[22] Filed: Apr. 4, 1983

[51] Int. Cl.⁴ .............................................. H04M 1/04
[52] U.S. Cl. .................................... 248/185; 248/346; 403/61
[58] Field of Search ............... 248/183, 184, 185, 346, 248/349, 178, 141, 139, 179, 299; 403/61, 82, 59; D14/113, 114

[56] References Cited

U.S. PATENT DOCUMENTS

| | | | |
|---|---|---|---|
| 253,594 | 12/1979 | Antenbring | D14/40 |
| 1,446,164 | 2/1923 | D'Eyraud | 403/90 |
| 2,414,110 | 1/1947 | Lee | 179/147 |
| 2,474,196 | 6/1949 | Coltman | 248/183 |
| 2,614,861 | 10/1952 | Van Horn | 248/299 |
| 2,922,609 | 1/1960 | Collier | 248/179 |
| 3,970,792 | 7/1976 | Benham | 248/183 |
| 4,068,961 | 1/1978 | Ebner | 403/61 |
| 4,365,779 | 12/1982 | Bates | 248/179 |
| 4,368,867 | 1/1983 | Pendelton et al. | 248/346 |

FOREIGN PATENT DOCUMENTS

| | | | |
|---|---|---|---|
| 490736 | 2/1953 | Canada | 248/183 |
| 0016913 | 10/1980 | PCT Int'l Appl. | 248/349 |

Primary Examiner—J. Franklin Foss
Assistant Examiner—Robert A. Olson
Attorney, Agent, or Firm—George Grayson; John S. Solakian

[57] ABSTRACT

Disclosed is a tilt-swivel base for a CRT display terminal. The base allows the CRT terminal to be readily swiveled around a vertical axis and tilted forward or backward around a horizontal axis or positioned with a combination of both movements. The cradle of the base may be placed within a recess formed in a horizontal supporting surface and thereby confine the base within the recess. By having the recess front-to-back width approximately equal to the front-to-back width of the cradle and the side to side length greater than the side to side width of the cradle, the CRT display terminal and base can be moved from side to side within the recess while still confining it to a fixed front-to-back position. By providing the cradle with a convex front surface and a triangular back surface, the base and CRT display terminal may be swiveled up to the point that one of the two angled back edges of the cradle comes into full contact with the back edge of the recess. The cradle is attached to the rocker drum of the base by means of a shouldered bushing which is attached to the center of the rocker drum by a screw.

19 Claims, 8 Drawing Figures

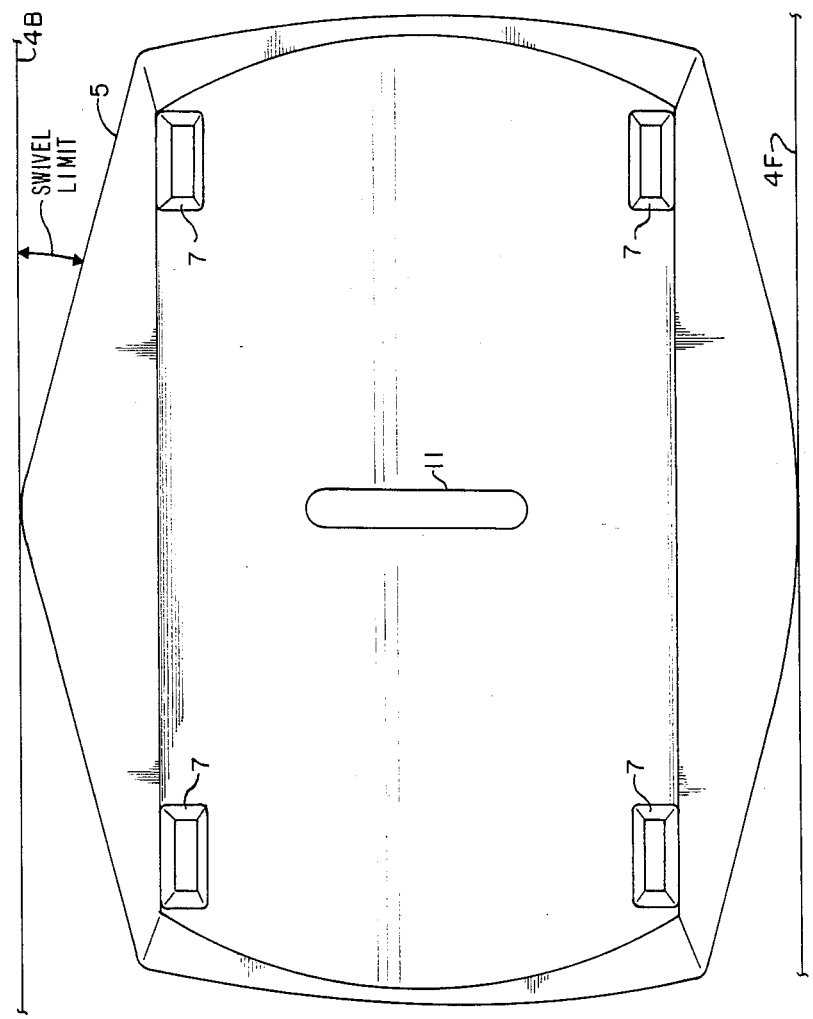

TILT-SWIVEL BASE FOR A CRT DISPLAY TERMINAL

RELATED APPLICATIONS

The following patent applications, which are assigned to the same assignee as the instant application, have related subject matter and are incorporated herein by reference.

| TITLE | INVENTORS | SERIAL NUMBER |
|---|---|---|
| Modular Computer System | Domenic R. Romano<br>Helmut H. Henneberg<br>James W. Pratt<br>Maurice A. Coppelman | 468,916,<br>2/23/83 |
| Desktop Computer System | Richard R. Dillon<br>David G. Kmetz<br>Edward J. Cesarczyk | 468,915,<br>2/23/83 |
| Low Profile Keyboard on Similar Article | Richard R. Dillon | 478,177,<br>3/23/83 |

BACKGROUND OF THE INVENTION

1. Field of the Invention

The present invention relates to positioning apparatus and more particularly to a base apparatus for adjusting the degree of tilt-swivel and side-to-side displacement of the screen of a cathode ray tube terminal device.

2. Description of the Prior Art

There has been a significant increase in the frequency of use of cathode ray tube (CRT) display terminal devices. Therefore, it becomes more essential to make such devices more convenient and comfortable for an operator to use. One problem encountered by operators concerns the amount and angle of incident light which falls on the screen surface of the CRT display device that produces reflection making it impossible in some instances for an operator to view information being displayed on the screen. Normally, the amount of incident light varies with the time of day and the displacement or positioning of the CRT device on the operator's work surface. In view of this, it becomes very desirable for an operator to be able to alter the viewing angle of the CRT screen's surface by tilting the CRT forward or backward so as to minimize or eliminate reflections.

Some prior art CRT display devices have the tilt mechanism built into the device. That is, the CRT's tube casing or housing is mounted on pivotal support base structures which permit the tube screen to be tilted by the operator. This type of arrangement has been found to introduce additional problems in constructing a suitable plastic housing or casing structure for the CRT device. Also, it becomes difficult to provide a tilt mechanism sturdy enough to meet stringent shock and vibration test requirements.

An alternative mechanism for providing the tilting of CRT screen is found in U.S. Pat. No. 4,368,867 entitled, "Tilt Base for a CRT Display Terminal". This patent discloses a tilt base assembly which includes a base and two pairs of elongated feet which attach to the bottom of the CRT display terminal. The base includes a pair of trapezoidal shapes base members which attach to the ends of a horizontal plate. The elongated feet suspended from the bottom of the terminal unit rests on both inclined surfaces of each trapezoidal shaped base member. The front inclined surfaces of the trapezoidal shaped base members are constructed to include a plurality of indentations which provide a corresponding number of fixed stationery positions for providing different operation viewing angles over a range of adjustment. This system has the disadvantage that the viewing angle is not continuously adjustable but instead is confined to a predetermined number of fixed positions. Further, the adjustment of the viewing angle may result in the raising of the center of gravity of the CRT display terminal and therefore require a certain amount of physical effort if the unit is heavy in order to adjust the viewing angle. In addition, since the trapezoidal base member is not attached to the CRT housing, moving the CRT terminal from one place to another may require several steps of: first lifting the terminal to remove the base, moving the base to the new location and then moving the terminal and placing it on the base.

With the advent of personal computers, it has become commonplace to mount a CRT display terminal on top of a enclosure which contains the computer electronics. These personal computers often have a detached typewriter type keyboard which is used by the operator to enter data and control system operation. For these systems, which have a detachable keyboard, it is often desirable to position the electronics enclosure and the top mounted CRT's display terminal off to one side on a desk and to have the keyboard directly in front of the operator on a desk or held in the operator's lap while it is used. In these situations, in which the electronics enclosure and CRT display is off to one side, it is often desirable to be able to swivel the CRT display relative to the electronics enclosure such that the operator can adjust it for operator viewing convenience. To accommodate this need to be able to swivel the CRT display screen relative to the electronics enclosure, various manufacturers have provided swivel mechanisms. One such mechanism is disclosed in U.S. Pat. No. Des. 253,594 entitled, "Combined Turn and Tilt Base". This mechanism provides for both the swivel and tilting of CRT display terminals relative to the electronics enclosure.

Other arrangements are known in the prior art. For example, it is known to use a gimbal mechanism in which the CRT is held by a U-shaped yoke which contains horizontal pins at each upper end of the yoke which support the CRT display and around which the CRT display may be pivoted to provide forward and backward tilt adjustment. The lower end of the yoke is pivotally mounted such that it may be rotated around a vertical axis and thereby allow the unit to be swiveled for operator viewing convenience. Unfortunately, this gimbal mechanism is relatively expensive to construct and often requires some sort of locking device in order to be able to hold the CRT terminal in the desired position. Further, depending upon the weight of the CRT display terminal, the CRT display housing may have to be reinforced around the pivot point to accommodate the relatively large amount of stress that is concentrated in a relatively small area. This type of yoke arrangement has the further disadvantage that different size yoke are needed to accommodate different size CRT display housings.

Another prior art design which provides for both the tilt and swivel of a CRT display unit is found in U.S. Pat. No. 3,970,792 entitled, "Adjustable Mounting Structure for Video Telephone Unit". This patent discloses a rocker member which is inserted within a rectangular socket in a turntable member having a circular periphery which is in turn inserted within a recess within a pedestal. The rocker member is attached to the bottom of the CRT display device and provides for the forward and backward tilting of the CRT display screen. The swiveling of the CRT display is provided by rotating the turntable member relative to the pedestal. In this design, the pedestal remains stationery with respect to the horizontal surface on which it is resting.

Another feature that is desirable with respect to a CRT display terminal that is mounted on top of an electronics enclosure such as that found in personal computers, is the ability to move the CRT display terminal toward one of the other edges of the electronics enclosure depending upon whether the unit is to the right or the left of the operator. This is desirable because the electronics enclosure is usually wider than the CRT display terminal and by moving the CRT display terminal toward either the right or left edge, the operator would be able to position the display terminal as close as possible to himself while still having the CRT display remain on top of the enclosure.

Therefore, what is desirable is to provide a base support mechanism which permit the adjustment of the CRT screen viewing angle by tilting the display forward or backward, swiveling the display around a vertical axis and the side-to-side displacement of the display terminal relative to the viewer.

OBJECTS OF THE INVENTION

Accordingly, it is a primary object of the present invention to provide a CRT terminal base for adjustment of the CRT viewing angle around a horizontal axis.

It is further object of the present invention to provide a tilt base which provides a continuous range of CRT screen viewing angle adjustment without requiring a lifting action.

It is a further object of the present invention to provide a tilt base which can be used on a wide variety of CRT displays having a range of housing sizes.

It is a further object of the present invention to provide a tilt base which has adjustable position holding mechanism which is inexpensive to construct and easy to adjust.

It is a still further object of the present invention to provide a tiltable base which provides a continuous range of CRT screen viewing angles around a vertical axis.

It is a yet further object of the present invention to provide a tiltable base which provides for the side-to-side displacement of the CRT terminal relative to the viewer.

It is yet a further object of the present invention to provide a base which is inexpensive to construct and easy to adjust for viewing angle.

This invention is pointed out with particularity in the appended claims. An understanding of the above and further objects and advantages of this invention can be obtained by referring to the following description taken in conjunction with the drawings.

SUMMARY OF THE INVENTION

The present invention is an adjustable mounting base for a CRT display terminal which allows the terminal to be rotated or swiveled readily and to be inclined or tilted readily by manual movement. To provide this degree of movement, a semi-circular rocker drum is mounted on the underside of the terminal housing. This rocker drum is supported by a cradle which in turn rests on any generally horizontal surface. The rocker drum is supported within the cradle in a manner which permits the rocker drum to be rotated relative to the cradle and thereby provide for the inclining or tilting of the display screen of the terminal. Once adjusted to the desired degree of tilt, the terminal is held in position by the friction between the rocker drum and the cradle. The rocker drum is slideably attached to the cradle in a manner which permits the rocker drum to be rotated relative to the cradle but prevents the sideways displacement of the rocker drum relative to the cradle. This attachment allows the terminal, rocker drum and cradle to be moved from place to place as a single unit. The means by which the cradle is attached to the rocker drum also permits the adjustment of the friction between the two which is used to hold the terminal in its inclined position. The bottom of the cradle is constructed in a manner which gives it a sufficiently low coefficient of friction that the unit may be readily rotated around a vertical axis thus allowing the viewing angle of the terminal screen to be adjusted. By giving the front bottom edge of the cradle a more or less semi-circular shape and the back bottom edge a triangular shape, the cradle can be inserted within a recess on a horizontal surface, such as the top of an electronics enclosure. By making the recess with a length longer than the length of the cradle and the width approximately equal to the width of the cradle, the cradle may be slid from side to side while being held relatively fixed with respect to front and back movement and still provide for the rotation of the cradle up to the limit imposed by the triangular shaped back edge. The size of the rocker drum and cradle and the placement of the rocker drum on the underside of the terminal are determined by the requirement that the center of gravity of the terminal must fall within the contact points of the cradle to the rocker drum and within the contact points of the cradle on its supporting horizontal surface. The relatively low profile of the base adds to the stability of the terminal and to the aesthetic quality of the overall appearance.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIGS. 2C is a top view of the cradle of the tilt and swivel base of the present invention as positioned with a recess in a horizontal surface.

DESCRIPTION OF THE PREFERRED EMBODIMENT

Figure 1A:
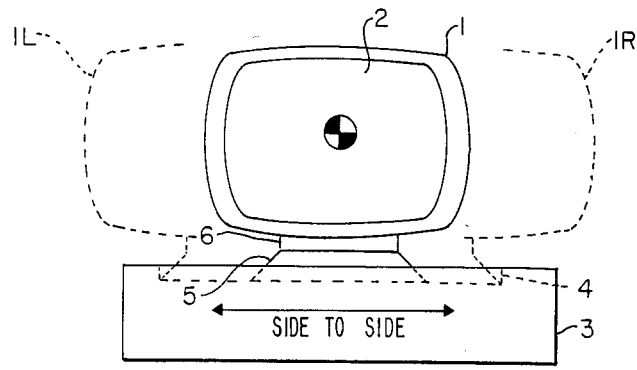
FIG. 1A is a front view of a CRT display terminal mounted on the tilt and swivel base of the present invention which is in turn supported by an electronics enclosure.
Figure 1B:
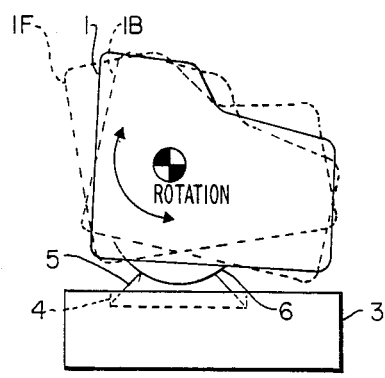
FIG. 1B is a side view in elevation of a CRT display terminal mounted on the tilt and swivel base of the present invention which is in turn mounted on an electronics enclosure.

FIGS. 1A and 1B depict a front and side view, respectively, of the tilt and swivel base comprised of cradle 5 and rocker drum 6, and associated cathode ray tube (CRT) display terminal 1 and electronics enclosure 3. The primary function of CRT display terminal 1 is to house a cathode ray tube which has a front facing video screen tube 2. Electronics enclosure 3 may hold one or more printed circuit boards and power supplies associated with the CRT display terminal 1 or the electronics associated with a personal computer. Not shown in the figures is a keyboard which is usually used by an operator for data entry and control in connection with CRT terminals or personal computers.

FIG. 1A, which is a front view, illustrates that the cradle 5 of the tilt and swivel base rests within a recess 4 formed on the top surface of electronics enclosure 3 and permits the side to side displacement of the cradle member 5 and thus provides for the side to side displacement of the CRT terminal 1. In the extreme left position, the left edge of CRT display terminal 1 will be as shown by dash line 1L and in the extreme right position it will be shown as by dash lines 1R. FIG. 1A also illustrates that the center of gravity of the CRT display terminal 1 falls vertically within the cradle member 5 of the tilt and swivel base.

FIG. 1B which is a side view, shows that the CRT terminal 1 may be rotated either forward or backward by rotating rocker drum 6 with respect to cradle 5. Thus, if the top edge of CRT display terminal 1 is rotated back (to the right in FIG. 1B) the CRT display terminal will take the position shown by dash lines 1B and if the top edge of CRT display terminal 1 is rotated forward, to the left in FIG. 1B, the CRT display terminal will take the position shown by the dash line FIG. 1F. FIG. 1B also illustrates that cradle 5 is retained within recess 4 formed on the top of electronics enclosure 3 such that the CRT display terminal 1 cannot be displaced either forward or backward with respect to electronics enclosure 3. In addition, FIG. 1B illustrates that the center of gravity of the CRT terminal falls within the points where cradle 5 contacts and supports rocker drum 6 of the tilt and swivel base.

Figure 1C:
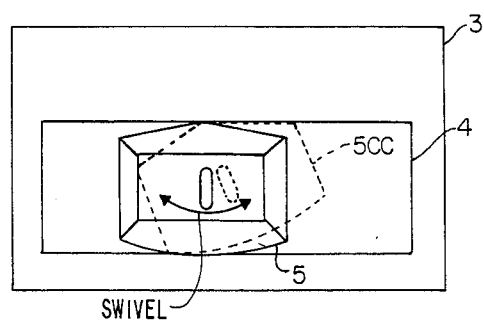
FIG. 1C is a top view of the cradle member of the tilt and swivel base of the present invention which is resting on an electronics enclosure.

FIG. 1C is a top view of electronics enclosure 3 and cradle 5 without the CRT terminal or rocker drum 6 present. FIG. 1C depicts the recess 4 formed in the top of electronics enclosure 3 to captivate cradle 5 such that the cradle can not be displaced either forward or backward but can be displaced side to side within the recessed. FIG. 1C also illustrates that the cradle base can be swiveled from side to side to rotate the CRT display terminal with respect to electronics enclosure 3. The broken line 5CC in FIG. 1C illustrates the cradle 5 when it has been swiveled to the extreme counterclockwise position within recessed 4. Although not shown in FIG. 1C for simplicity, cradle 5 can also be rotated in the clockwise direction. Thus, FIGS. 1A, 1B and 1C illustrate the degrees of freedom available for the adjustment of CRT display terminal 1 when mounted on top of electronics enclosure 3.

In addition to being designed to be mounted within a recess in the top surface of an electronics enclosure or other horizontal surface, the tilt and swivel base is designed to rest on other horizontal suitable surfaces such that the cradle can be rotated relative to the horizontal surface to provide for the horizontal swiveling of the CRT display terminal and for the rotation of the rocker drum relative to the cradle to provide for the tilting of video screen 2. Further, when the cradle rests on a smooth horizontal surface, the cradle may be slid either left to right or front to back relative to the horizontal surface or a combination of the two to provide for the displacement of the CRT terminal to allow the distance between the video screen 2 and the operator to be adjusted. These degrees of freedom allow the video screen 2 to be properly positioned for viewing. The tilt and swivel base allows this freedom and positioning. The base construction allows continuous settings in the tilt sense within the limits provided by the means which limits the rotation of the rocker drum relative to the cradle. The base construction also allows infinite continuous settings in the swivel sense if the cradle is housed on a horizontal surface without a recess and allows continuous settings within the swivel sense and side to side sense up to the limits imposed by the shape and size of the recess and cradle when the cradle is confined within a recess.

FIGS. 2A, 2B, 2C, 3A and 3B show in greater detail the tilt and swivel base. The tilt-swivel base includes a cradle 5 with a flat bottom surface adopted to rest within a recess formed on the top of an electronics enclosure or other horizontal surface such as the top of a flat desk or table if it is not necessary to contain the CRT terminal to prevent it from falling off. In the preferred embodiment, the cradle 5 is molded from a General Electric Lexan 940 type plastic and has a nominal wall thickness of 0.156 inches and the rocker drum 6 portion of the CRT housing is molded from General Electric Noryl N-190 type plastic and has a nominal wall thickness of 0.15 inches. Other suitable materials and thicknesses can be used. As is visible in the back view of FIG. 2A and the side view of FIG. 2B, the bottom edge of cradle 5 which is in contact with the horizontal surface is molded to have feet at the corners and midpoints of the front and back edges such that the amount of the bottom edge in contact with the horizontal surface is reduced thereby allowing the cradle to be rotated and slid over its supporting horizontal surface with minimal effort.

Figure 2A:
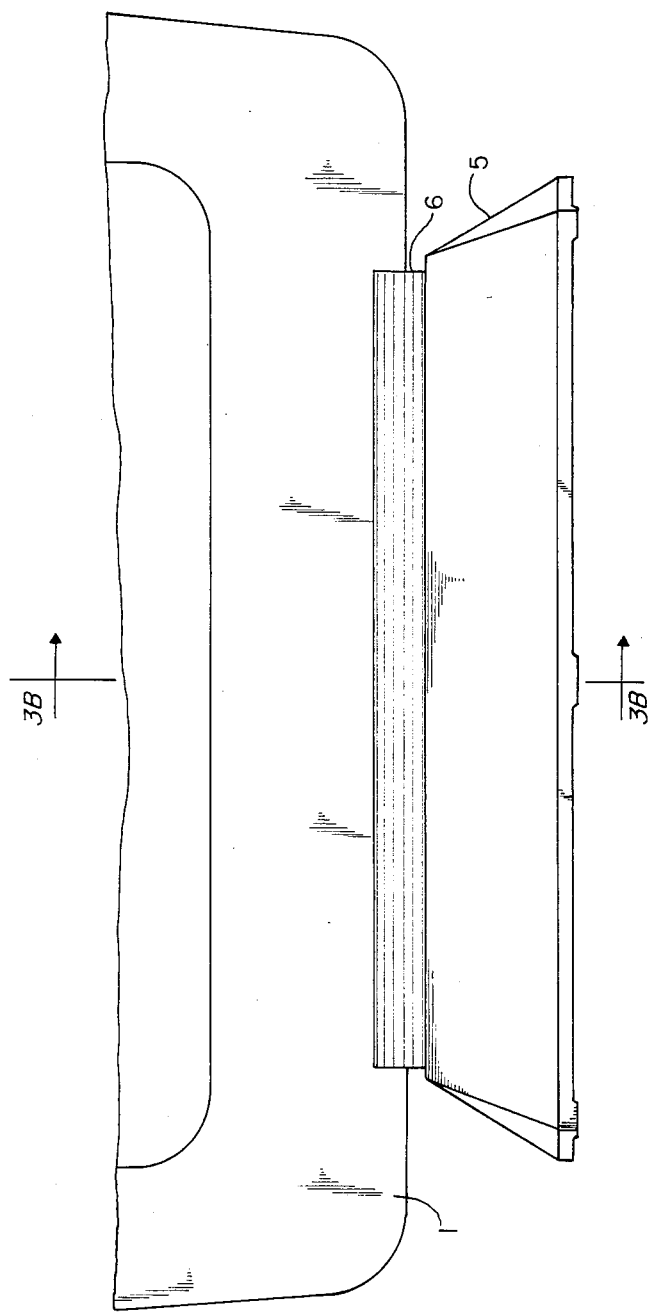
FIG. 2A is a back view of the cradle and rocker drum of the tilt and swivel base of the present invention shown with the lower portion of a CRT display terminal.
Figure 2B:
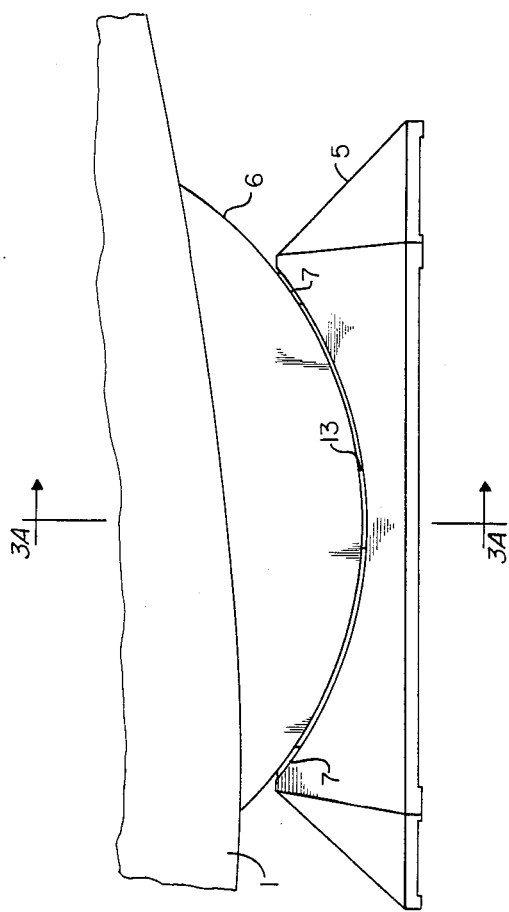
FIG. 2B is a side view in elevation of the cradle and rocker drum of the tilt and swivel base of the present invention including a portion of the CRT display terminal.

The bottom edge of cradle 5 should be sufficiently large to provide structural stability for the display terminal in a conventional manner. As is illustrated in FIGS. 2A, 2B and 2C, the shape of the cradle in the preferred embodiment is more or less trapezoidal in shape both from a front and side view thus providing that the feet on the bottom of the cradle in contact with the horizontal surface on which it rests will be widely enough space so that the center of gravity of the CRT display terminal falls well within the perimeter of the area defined by the cradle feet. In the preferred embodiment, for a display CRT display unit that contains a 12 inch diagonally measured video screen, in which the CRT housing is approximately 10.5 inches in front face height, approximately 13 inches in width and approximately 13 inches in depth, weighing approximately 15 pounds, a cradle having a length of approximately 10 inches and a width of approximately 8 inches has been found to provide sufficient support and stability for the CRT display terminal. The cradle and rocker drum of the preferred embodiment is also intended to be used as a base for a CRT display terminal having a cathode ray tube with a 15 inch diagonally measured video screen which has a bigger terminal housing than that described above.

Figure 3A:
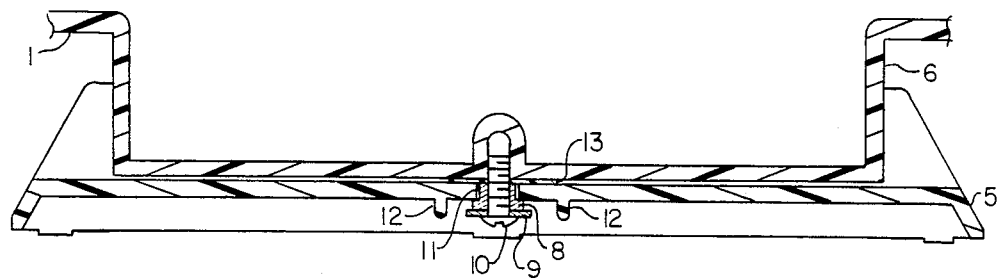
FIG. 3A is a front sectional view of the rocker drum and cradle of the present invention taken in the direction indicated by line 3A—3A of FIG. 2B.
Figure 3B:
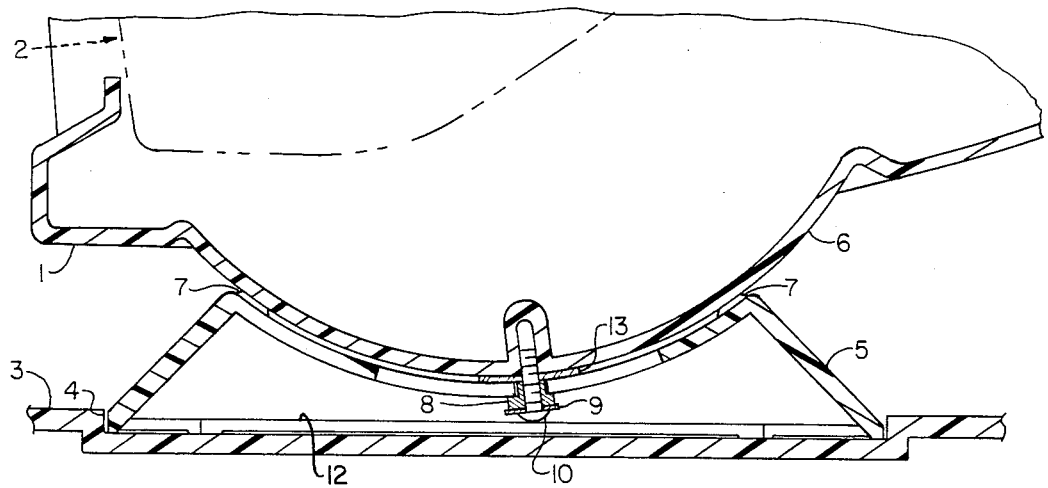
FIG. 3B is a side sectional view of the rocker drum and cradle of the present invention and the top of an electronics enclosure having a recess taken in the direction indicated by lines 3B—3B of FIG. 2A.

The upper surface of cradle 5 is cylindrically concave to receive rocker drum 6 as is visible in FIGS. 2B and 2C. In the preferred embodiment, rocker drum 6 is molded as an integral part of the bottom of CRT display terminal 1 housing as is illustrated in FIGS. 3A and 3B. Although molded as an integral part of the CRT housing bottom in the preferred embodiment, it is also envisioned that rocker drum 6 may be a separate component and affixed to the bottom surface of a CRT display terminal by means of screws or adhesive. The arcuate surface of rocker drum 6 is formed to have a constant radius and in the preferred embodiment has a radius of approximately 4.0 inches. To reduce the amount of friction that would otherwise be found between the upper surface of cradle 5 and the lower surface of rocker drum 6, in the preferred embodiment four bearing pads 7 are molded into the upper surface of cradle 5 to support rocker drum 6. These bearing pads 7 are placed near the corners of the upper surface of cradle 5 for maximum stability. The dimensions of the upper surface of cradle 5 are preferably sufficiently large such that the bearing pads formed on its upper surface which support rocker drum 6 will be sufficiently widely spaced to permit the center of gravity to fall between them such that the weight of the CRT terminal will be more or less evenly distributed among the bearing pads. In the preferred embodiment, which is used with the above described CRT display terminal, the centers of these bearing pads are spaced approximately 7.0 inches apart when measured from side to side and 4.75 inches apart when measured from front to back. It should be noted that the center of gravity of the CRT display terminal 1 may shift from front to back as the rocker drum 6 is rotated relative to cradle 5 for adjustment of the tilt of the screen and this must be taken into account when determining the placement of rocker drum 6 on the bottom of the CRT display terminal and when determining the size of the rocker drum 6 and cradle 5. As indicated above, this one size rocker drum and cradle has been found to be suitable for both 12 inch and 15 inch cathode ray tube terminals.

Cradle 5 is slideably affixed to rocker drum 6 in a manner that permits the rotation of rocker drum 6 relative to cradle 5 but still prohibits the side to side, when viewed from the front as in FIG. 3A, displacement of rocker drum 6 relative to cradle 5. By attaching the cradle 5 to rocker drum 6 in this manner, the tilt-swivel base becomes a single unit such that the CRT display terminal and the base can be moved about as a single unit without having to first move the cradle and then position the CRT terminal and rocker drum on top of the cradle. In the preferred embodiment, the rocker drum 6 is attached to cradle 5 by forming a slot 11 in the upper surface of cradle 5 as is illustrated in the top view of FIG. 2C. The length of this slot, that is, the number of degrees of arc determine the amount of tilt to which the CRT terminal can be adjusted and in the preferred embodiment, the slot is sufficiently long to allow 17 degrees backward tilt from vertical and 7 degrees forward tilt from vertical such that the operator can adjust the viewing angle of the screen continuously through 24 degrees.

The cradle is attached to rocker drum 6 by placing a screw through the slot and into the lower surface of rocker drum 6 as is visible in FIGS. 3A and 3B. As can be seen in FIGS. 3A and 3B, the screw is surrounded by a shouldered bushing 8 which has a diameter slightly less than the width of slot 11 and has a length (excluding the shoulder) approximately equal to the thickness of cradle 5. Shouldered bushing 8 is of nylon but another lubricious material can be used so long as it has suitable durability and low friction properties. Shouldered bushing 8 is held in place by screw 10 and steel washer 9 which provides a bearing surface. Screw 10 is self locking so that it will not loosen as the rocker drum 6 is rotated relative to cradle 5. Sandwiched between cradle 5 and rocker drum 6 is felt washer 13 which provides a means for adjusting the friction between the cradle and the drum. By increasing or decreasing the compression of felt washer 13 by adjustment of screw 10, the friction between the bearing pads 7 and rocker drum 6 and between cradle 5, felt washer 13 and rocker drum 6 can be adjusted so the terminal tilt can be manually adjusted with ease but yet hold in position without requiring other position locking means. In the preferred embodiment, washer 13 is made of felt but other materials which will conform to the radius between cradle 5 and rocker drum 6 and have a proper coefficient of friction can be used.

FIG. 3A, which is a front sectional view of the cradle 5 and rocker drum 6, also shows that parallel to slot 11 there are two ribs 12 formed to add rigidity to the cradle and reinforce it in the area of slot 11. In FIG. 3B, in addition to illustrating cradle 5 and rocker drum 6, also shows a portion of the top electronics enclosure 3 which shows that a recess 4 is molded into its top surface so as to retain and limit the movement of cradle 5 relative thereto. FIG. 3B also shows in dashed lines a portion of a cathode ray tube within the housing and the front facing video screen 2. By viewing FIG. 3A it can be appreciated that the means used to attach the cradle 5 to rocker drum 6 must be sufficiently strong to stand any sideways force which can result from pushing CRT display terminal 1 from side to side with the intended purpose of sliding cradle 5 over the horizontal surface on which it is resting. From FIG. 3B it can be further appreciated that the means for fixing rocker drum 6 to cradle 5 must also be sufficient to withstand the shocks which may be encountered when rocker drum 6 is rotated with respect to cradle 5 and will eventually result in bushing 8 coming in contact with the ends of slot 11 which are used to limit the amounts of rotation of rocker drum 6 relative to cradle 5 and thereby limit the amount of tilt of the video screen 2.

Although in the preferred embodiment, the slot 11 is formed in cradle 5 and the screw 10 is mounted in rocker drum 6 because this permits easy assembling with access to the bottom of cradle 5, the inverse arrangement could be used with the screw 10 being mounted into the top surface of cradle 5 and the slot being formed in rocker drum 6. However, this inverse design has the disadvantage that, in the preferred embodiment, it would be very difficult to adjust the position holding friction because self-locking screw 10 would not be convenient to adjust either initially or as the friction coefficients between the rotating parts changes over time.

Other arrangements of attaching cradle 5 to rocker drum 6 have also been envisioned. For example, in an alternative embodiment, cradle 5 was formed such that the ends of the cradle formed a box around rocker drum 6. In this alternative embodiment, a circular hole was formed in each end of these raised ends of cradle 5. A rod is placed through these holes running from side to side of the cradle approximately at the midpoint of the concave top surface. To allow this rod to pass through rocker drum 6, a curved slot is formed in each end of rocker arm 6 such that the cylindrical portion of rocker drum 6 is retained between the rod and the upper surface of cradle 5. In this alternative environment, the degree of rotation of rocker drum 6 relative to cradle 5 is limited by the extent of the curved slots formed in the ends of rocker drum 6. This rod and arced-slot attachment arrangement lacks the continuous friction adjustment provided by screw 10 and felt washer 13.

In addition to providing for the ability to move the tilt and swivel base and the CRT display terminal as a single unit, the attachment of cradle 5 to rocker drum 6 in a slideable manner also allows the contact perimeter of cradle 5 with rocker drum 6 to the less than that of cradle 5 to horizontal surface upon which it rests while still insuring that the tilt and swivel base provides a stable support means for the CRT display terminal. Although in the preferred embodiment, the cradle has more or less of a trapezoidal shape when viewed from either the front, back or sides (see FIGS. 2A and 2B), other aesthetically pleasing shapes could be used so long as they provide that the center of gravity of the CRT terminal 1 will comfortably fall within the contact perimeter of the cradle and the horizontal surface on which it rests.

As can be seen in FIG. 2C, which is a top view of cradle 5, the front bottom edge of cradle 5 is circular in shape whereas the back bottom edge of cradle 5 is triangular in shape. In the preferred embodiment, the radius of the circular front bottom edge is approximately 8 inches with the center of the circle being at the apex of the triangular back bottom edge. By shaping the bottom edge of cradle 5 in this manner, the cradle 5 can be swiveled within a recess and more or less retain the front of the bottom edge of cradle 5 in contact with the front edge 4F of the recess while at the same time having the apex of the triangular back edge of cradle 5 remain in contact with back edge 4B of the recess (see FIG. 2C). The angle formed between the bottom edge of cradle 5 and a straight line running from side to side determines the swivel limit through which the cradle and therefore the CRT terminal itself can be rotated. In the preferred embodiment, the back bottom edge of cradle 5 is angled at 15 degrees such that the tilt-swivel base may be rotated either 15 degrees counterclockwise or 15 degrees clockwise (when viewed from above). This provides a total range of 30 degrees of continuous adjustment available to the operator to adjust the viewing angle of the video screen when the CRT display terminal is mounted on an electronics enclosure having a recess approximately 8 inches wide. Although in the preferred embodiment, the recess formed in the top of the electronics enclosure 3 is of only sufficient width to accommodate the width of cradle 5, a larger width recess could be formed if it is desirable to provide for front and back movement of the CRT display 1 with respect to electronics enclosure 3. It will also be appreciate that the other shapes can be used for the bottom edge of cradle 5 and that the front and back of cradle 5 as shown in FIG. 2C could be reversed.

From the above description and the figures, it can be appreciated that the tilt and swivel base of the present invention is designed to give the operators of CRT display terminals the means for easily adjusting the viewing angle of the video screen for the comfort and convenience of the operator. Adjustment can be easily made with one hand and requires no tightening of any locking device. The tilt position of the terminal is maintained by friction between the cradle 5 and rocker drum 6 and cradle 5, felt washer 13 and rocker drum 6. The swivel and side-to-side position of the terminal is maintained by the friction between cradle 5 and the horizontal surface on which it rests. The base provides for continuous adjustment of viewing angle and position, as opposed to incremental adjustment, within its design limits. The base presents a low profile which increases stability of the CRT display terminal and has the further feature that the CRT display terminal can either be used on top of an enclosure without danger of falling off and equally provides for the CRT display terminal to be easily moved to any suitable horizontal surface.

While the invention has been shown and described with reference to the preferred embodiment thereof, it will be understood by those skilled in the art that the above and other changes in form and detail may be made therein without departing from the spirit and scope of the invention.

What is claimed is:

1. A base which supports a CRT display terminal having a viewing screen on one side thereof, said base for providing a wide range of operator viewing angles, said base being adapted to rest on a generally horizontal surface, said base comprising:
   a rocker drum having a convex arcuate lower wall, said rocker drum when attached to a bottom surface of said terminal having said arcuate wall extending downwardly from said terminal;
   a cradle having a bottom surface adapted to rest on said generally horizontal surface, said cradle having an upper surface for engaging and supporting said arcuate lower wall of said rocker drum, said cradle having a slot in its upper surface;
   wherein said horizontal surface has a recess having a width from front to back slightly longer, but approximately equal to, the width of said cradle and a length from side to side substantially longer than the length of said cradle such that said cradle when resting in said recess cannot be displaced appreciably from front to back, but can be displaced from side to side by sliding said cradle within the length of said recess thereby allowing said terminal, when attached to said rocker drum, to be positioned for viewing said viewing screen;
   wherein a back bottom edge of said cradle is triangular shaped with the apex of the triangle located in the middle of said back bottom edge; and
   wherein the front bottom edge of said cradle is arcuate with a radius approximately equal to said width of said cradle and the center of said arc at said apex at said center of said back bottom edge such that said cradle can be rotated in said recess in either a clockwise or a counterclockwise direction around a vertical axis thereby allowing said terminal, when attached to said rocker drum, to be swiveled for adjustment of said viewing angle of said viewing screen while more or less maintaining said apex of said back bottom edge and a point of said arcuate front bottom edge in contact with a back edge and front edge of said recess respectively; and a post attached to said rocker drum and protruding generally downward therefrom and into said slot in the upper surface of the cradle, said slot having a length which runs perpendicular to an axis of rocker drum when said rocker drum is resting in said cradle, said length of said slot being sufficient to allow said rocker drum to be rotated relative to said cradle to an extreme forward and backward position before said post hits either end of said slot, said slot being sufficiently wide to accommodate the width of said post, wherein said post and said slot slideably attach said rocker drum to said cradle such that said rocker drum can be rotated around a generally horizontal axis relative to said cradle to enable manually setting inclination of said viewing screen, said post for preventing the sideways motion of said rocker drum relative to said cradle, wherein said rocker drum to cradle engagement can frictionally hold said terminal when attached to said rocker drum in an inclined position to which said terminal is manually set.

2. A base as in claim 1, wherein said rocker drum and said cradle are of sufficient size to permit said rocker drum to be positioned on said bottom surface of said terminal such that the center of gravity of said terminal can fall, when said terminal is inclined to either an extreme forward or backward position, within said bottom surface of said cradle in contact with said generally horizontal surface and wherein said center of gravity will also fall within an area of contact between said cradle and said rocker drum.

3. A base as in claim 2, wherein said bottom surface of said cradle in contact with said generally horizontal surface has a sufficiently low coefficient of friction such that said cradle, said rocker drum and said terminal to which said rocker drum can be attached can be rotated about a generally vertical axis as a unit when said cradle is resting on said generally horizontal surface to enable manually settable swiveling of said viewing screen, said cradle to horizontal surface engagement being sufficient to frictionally hold said terminal in a swiveled position to which it is manually set.

4. A base as in claim 3, wherein said bottom surface of said cradle in contact with said generally horizontal surface has a sufficiently low coefficient of friction such that said cradle, said rocker drum and said terminal to which said rocker drum can be attached can be slid over said generally horizontal surface as a unit in any direction to enable manually settable displacements of said viewing screen, said cradle to horizontal surface engagement being sufficient to frictionally hold said terminal in a displaced position to which it is manually set.

5. A base as in claim 1 wherein said post and slot further comprises a means for continuously adjusting the position holding friction between said rocker drum and said cradle.

6. A base as in claim 1, wherein a lower end of said post that projects downward through said slot has a head that is wider than said slot such that when said rocker drum is attached to said terminal, said terminal can be lifted and moved from place to place while retaining said cradle more or less in its same position relative to said rocker drum.

7. A base as in claim 6 wherein said post comprises a cylindrical shouldered bushing having an outer diameter slightly less than the width of said slot and length, excluding said shoulder, approximately equal to the thickness of said slot, and wherein the said shoulder has an outer diameter greater than said width of said slot and wherein said bushing is attached to said rocker drum by a washer and a screw or similar means.

8. A base as in claim 7 wherein said shouldered bushing is made of a lubricious material and wherein there is a friction washer sandwiched between said rocker drum and said cradle and retained by said screw and wherein adjustment of said screw can adjust the friction between said rocker drum and cradle and between said rocker drum, said friction washer and said cradle which is used to maintain the manually adjusted position of said rocker drum relative to said cradle.

9. A base as in claim 1, where said post is positioned on said rocker drum and said slot is positioned on said cradle and of such length that said rocker drum can be continuously rotated through a 24 degree angle relative to said cradle.

10. A base as in claim 1 wherein said upper surface of said cradle is a concave arcuate wall having a radius approximately equal to that of said rocker drum.

11. A base as in claim 1 wherein said rocker drum rests on two pairs of bearing pads with each of said bearing pads positioned near an upper corner of said cradle so as to support said rocker drum in a stable manner.

12. A base as in claim 1 wherein said rocker drum and said cradle are molded of plastic having a predetermined hardness characteristic.

13. A base as in claim 12, wherein said rocker drum is molded as a bottom part of a housing enclosing said terminal.

14. A base as in claim 1, wherein said arcuate wall of said rocker drum has a radius of approximately 4 inches and a side to side dimension of approximately 8 inches.

15. A base as in claim 14, wherein said cradle is approximately 10 inches long and 8 inches in width at the bottom edge that rests on said generally horizontal surface.

16. A base as in claim 1, wherein surfaces of said rocker drum and said cradle which come in contact with one another are smooth so as to minimize the friction forces when said rocker drum is rotated relative to said cradle.

17. A base for supporting a CRT display terminal having a viewing screen on one side thereof, said base for providing a wide range of operator viewing angles, said base being adapted to rest on a generally horizontal surface, said base comprising:

a rocker drum having a convex arcuate lower wall, said rocker drum when attached to a bottom surface of said terminal having said arcuate wall extending downwardly from said terminal;

a cradle having a bottom surface adapted to rest on said generally horizontal surface, said cradle having an upper surface for engaging and supporting said arcuate lower wall of said rocker drum, wherein said horizontal surface has a recess having a width, from front to back, slightly larger but approximately equal to, the width, of said cradle and a length, from side to side, substantially longer than the length of said cradle such that said cradle when resting in said recess can not be displaced appreciably from front to back but can be displaced from side to side by sliding said cradle within the length of said recess thereby allowing said terminal when attached to said rocker drum to be positioned for viewing said viewing screen; and wherein a back bottom edge of said cradle is triangular shaped with the apex of the triangle located in the middle of said back bottom edge and wherein the front bottom edge of said cradle is arcuate with a radius approximately equal to said width of said cradle and the center of said arc at said apex at said center of said back bottom edge such that said cradle can be rotated in said recess in either a clockwise or counterclockwise direction around a vertical axis thereby allowing said terminal when attached to said rocker drum to be swiveled for adjustment of said viewing angle of said viewing screen while more or less maintaining said apex of said back bottom edge and a point of said arcuate front bottom edge in contact with a back edge and a front edge of said recess respectively; and a slideable attachment means for slideably attaching said rocker drum to said cradle such that said rocker drum can be rotated around a generally horizontal axis relative to said cradle to enable manually setting inclination of said viewing screen when said rocker drum is attached to said terminal, said slideable attachment means also for preventing the sideways motion of said rocker drum relative to said cradle, wherein said rocker drum relative to said cradle, wherein said rocker drum to cradle engagement can frictionally hold said terminal when attached to said rocker drum in an inclined position to which said terminal is manually set.

18. The base as in claim 17 wherein said each side of triangular back edge is angled at 15 degrees thereby allowing said base to be swiveled continuously from 15 degress clockwise through 15 degrees counterclockwise.

19. The base as in claim 17, wherein said radius of said arcuate front bottom edge is approximately 8 inches.

* * * * *